(12) United States Patent
Blake et al.

(10) Patent No.: US 11,509,518 B2
(45) Date of Patent: Nov. 22, 2022

(54) NETWORK FAULT DIAGNOSIS

(71) Applicant: SPATIALBUZZ LIMITED, Guildford (GB)

(72) Inventors: Andrew Blake, Guildford (GB); Michael Shannon, Redhill (GB); Christopher John Haslett, Burgh Heath (GB)

(73) Assignee: SPATIALBUZZ LIMITED, Guildford (GB)

( * ) Notice: Subject to any disclaimer, the term of this patent is extended or adjusted under 35 U.S.C. 154(b) by 0 days.

(21) Appl. No.: 17/244,249

(22) Filed: Apr. 29, 2021

(65) Prior Publication Data
US 2021/0344553 A1 Nov. 4, 2021

(30) Foreign Application Priority Data
Apr. 30, 2020 (GB) .................................... 2006432

(51) Int. Cl.
*H04L 41/0631* (2022.01)
*H04L 41/069* (2022.01)

(52) U.S. Cl.
CPC .......... *H04L 41/064* (2013.01); *H04L 41/069* (2013.01)

(58) Field of Classification Search
CPC ........................... H04L 41/064; H04L 41/069
USPC ....................................................... 709/223
See application file for complete search history.

(56) References Cited

U.S. PATENT DOCUMENTS

| | | | |
|---|---|---|---|
| 8,135,828 B2* | 3/2012 | Agarwal | H04L 41/0631 709/224 |
| 8,214,290 B1* | 7/2012 | Vannatter | G07F 19/209 705/43 |
| 8,527,622 B2* | 9/2013 | Moreira Sa de Souza | H04L 41/0636 709/224 |
| 9,565,080 B2* | 2/2017 | Jain | H04L 67/327 |
| 9,753,800 B1 | 9/2017 | Jadunandan et al. | |
| 9,888,353 B2* | 2/2018 | Reed | H04B 17/318 |
| 10,270,644 B1* | 4/2019 | Valsecchi | H04L 41/0654 |
| 10,411,356 B2* | 9/2019 | Johnson | H01Q 21/20 |
| 10,677,629 B1* | 6/2020 | Javey | G01F 15/003 |
| 10,728,085 B1* | 7/2020 | Chen | H04L 41/0659 |
| 11,205,103 B2* | 12/2021 | Zhang | G06N 3/084 |
| 11,209,813 B2* | 12/2021 | Cella | G06K 9/62 |
| 2007/0055640 A1* | 3/2007 | Dababneh | G06Q 50/06 705/412 |
| 2012/0321052 A1* | 12/2012 | Morrill | H04L 67/18 379/32.01 |

(Continued)

FOREIGN PATENT DOCUMENTS

EP 2887579 A1 6/2015

OTHER PUBLICATIONS

Patents Act 1977: Search Report under Section 17 for Application No. GB2006432.5 dated Oct. 22, 2020, 1 page.

*Primary Examiner* — Melvin H Pollack
(74) *Attorney, Agent, or Firm* — Womble Bond Dickinson (US) LLP

(57) ABSTRACT

A method of diagnosing faults in a utility supply network involves receiving performance data indicative of performance of the utility supply network, and receiving historical performance data indicative of a historical performance of the utility supply network and a fault associated with the historical performance data. A fault in the utility supply network is determined based on a comparison of the performance data with the historical performance data.

20 Claims, 3 Drawing Sheets

(56) References Cited

U.S. PATENT DOCUMENTS

| | | | |
|---|---|---|---|
| 2014/0337277 A1* | 11/2014 | Asenjo | G06Q 10/06 |
| | | | 707/603 |
| 2015/0016260 A1* | 1/2015 | Chow | H04L 47/125 |
| | | | 370/235 |
| 2015/0254330 A1* | 9/2015 | Chan | G06F 16/219 |
| | | | 707/613 |
| 2015/0254969 A1* | 9/2015 | Bishop | H04L 41/0622 |
| | | | 340/506 |
| 2016/0087864 A1* | 3/2016 | Kerpez | H04L 1/20 |
| | | | 370/242 |
| 2016/0217133 A1* | 7/2016 | Reiter | G08B 5/22 |
| 2016/0315826 A1* | 10/2016 | Abdulnour | H04L 41/5067 |
| 2017/0201897 A1 | 7/2017 | Yang et al. | |
| 2017/0230272 A1* | 8/2017 | Blake | H04W 4/025 |
| 2017/0310546 A1* | 10/2017 | Nair | H04L 41/0654 |
| 2018/0121845 A1* | 5/2018 | Bojovschi | G06Q 10/20 |
| 2018/0220312 A1* | 8/2018 | Guttenfelder | H04M 1/24 |
| 2018/0349514 A1* | 12/2018 | Alzate Perez | G06F 16/24522 |
| 2019/0166606 A1* | 5/2019 | Kalderen | H04B 7/0842 |
| 2020/0097352 A1* | 3/2020 | Mahindru | G06F 11/079 |
| 2020/0233391 A1* | 7/2020 | Ma | G06K 9/00369 |
| 2020/0259896 A1* | 8/2020 | Sachs | G06K 19/06028 |
| 2020/0409326 A1* | 12/2020 | Jiang | G05B 23/024 |
| 2021/0058154 A1* | 2/2021 | Musumeci | H04B 10/07953 |
| 2021/0306201 A1* | 9/2021 | Wang | G06F 16/2228 |

* cited by examiner

NETWORK FAULT DIAGNOSIS

CROSS REFERENCE TO RELATED APPLICATIONS

The present application claims the priority benefit of United Kingdom Patent Application No. GB 2006432.5, entitled "NETWORK FAULT DIAGNOSIS" and filed on Apr. 30, 2020, which is incorporated by reference herein in its entirety.

FIELD OF INVENTION

The present invention relates to network fault diagnosis in a utility supply network (such as a mobile communications network) and to a network fault diagnosis tool.

BACKGROUND OF THE INVENTION

Faults occur in utility supply networks, as in all other complex technical systems. In the context of a cellular, or mobile, network, such faults include the failure of hardware components in the base-stations of the mobile network, failures in other systems which are connected to multiple base-stations (for example, the radio network controller—RNC—in a 3G system, the loss of which results in the loss of operation of large sections of the network, such as, all node B base-stations connected to the RNC) and failures to switching and other more centralised functions, which again would impact multiple areas of the network simultaneously.

When such failures occur, it is important to identify them as quickly as possible, so that simple remote measures may be taken to alleviate the fault (for example, resetting a piece of network equipment) and/or so that a maintenance team can be dispatched to repair the fault and restore service to the customers of the network. It is equally, if not more, important to enable customers affected by the failure to be kept informed about the fact that a failure has occurred (hence relieving customer anxiety that their mobile device may be at fault) and also about the progress of a repair and the likely time at which service will be restored. This is increasingly important in keeping customers happy and reducing their likelihood of moving to another network operator due to a perception of poor service from their existing network operator.

One mechanism by which a network operator may be alerted to failures or issues on their network is by equipment alarms that are fitted to most items of network equipment. These equipment alarms indicate a range of major failures and more minor warnings. For example, a major failure alarm may occur if a base-station's RF output power drops to zero when it should be dealing with traffic (for example, during a busy part of the day), whereas a warning alarm may result from the output power being at a lower level than the power level to which it has been set (but where the power level has not dropped to zero).

Although an alarm or warning may indicate a fault that should be repaired, ideally as soon as possible, it is not typically realistic for network operators to deal with all alarms and warnings immediately. An operator's network will typically consist of tens of thousands of base stations and the network operator may be seeing thousands of alarm signals at any given point in time. The network operator does not have the resources to deal with all of these alarms simultaneously and, in most cases, the network can continue to function adequately despite the presence of these many alarms. For example, the low output power discussed above may, nevertheless, be adequate to provide a satisfactory service to the users of the affected cell, in which case the network operator need only deal with the problem during the next scheduled maintenance visit, if at all.

So, while alarms and warnings are useful to the network operator, they are not sufficient by themselves to allow the network operator to manage its maintenance tasks efficiently. The network operator needs an additional mechanism to allow it to prioritise repairs and, indeed, decide whether a repair is even necessary.

The current means of undertaking this ranking of repairs usually relies upon crude measures, which may include:
1) the number of users typically served by a given cell—the higher the number of users, the higher the priority for repair;
2) the revenue generated by the cell—again, the higher the number, the higher the priority for repair; and
3) the status of the users covered by the cell—a higher than average number of key influencers, high-spending users or VIPs within a cell's curtilage, the higher the priority for repair.

At present, network operators rely upon a disparate array of systems for managing and reporting faults, planned network outages, progress updates for repairs which are underway and the identification and location of congestion events and other aspects which impact the customer's experience of a mobile operator's network. As a customer, however, all of these result in a single outcome: poor (or no) mobile service. Reporting the fact that such issues are known (or not, which may indicate a problem with the user's mobile device) and when they are likely to be resolved, is becoming increasingly important in the quest to retain customers and reduce customer 'churn' (customers moving from one network operator to another).

In addition, a problem exists with existing reporting mechanisms which generate hundreds or thousands of alarms across a network simultaneously—far more than a network operations team can sensibly deal with. These alarms are not necessarily indicative of a major issue with that particular part of the network and it is currently difficult for an operator to prioritise which alarms indicate faults or even to determine that a fault really exists (it could be that the alarm-generating mechanism is itself at fault).

Finally, there is the above-mentioned issue of disparate systems being used by the operator to collect, diagnose and manage faults, alarms and maintenance tasks in general (e.g. scheduled maintenance tasks). These systems do not always inter-connect and may have been provided by different suppliers, making the subsequent inter-connection of such systems challenging, time consuming and expensive.

It would, therefore, be advantageous to find a way to overcome or at least mitigate these problems.

SUMMARY OF THE INVENTION

According to a first aspect of the invention, there is provided a network fault diagnosis tool for diagnosing faults in a utility supply network. The network fault diagnosis tool comprising an input configured to receive performance data indicative of performance of the utility supply network and a processor. The processor is configured to obtain historical performance data indicative of historical performance of the utility supply network and a fault associated with the historical performance data, and determine a fault in the utility supply network based on comparing the performance data and the historical performance data.

The network fault diagnosis tool of the present invention enables faults in a utility supply network (such as a communications network) to be diagnosed by comparing current network performance data with historic network performance data relating to known network faults. This allows faults to be identified and addressed more quickly, without requiring a network engineer, in a much more efficient manner than identifying and diagnosing faults based on multiple alarms or data spread across multiple disparate systems.

The utility supply network may be a communications network, such as a mobile communications network.

The performance data and the historical performance data may comprise subjective data relating to a user perception of the performance of the utility supply network.

The subjective data may be generated in response to a communication from the user regarding the performance of the utility supply network. For example, in response to a "status check" by the user, that is, a request by a user for the current status (expected performance) of the utility supply network.

The subjective data may be generated in response to one or more of: a user requesting a status check on the performance of the utility supply network; a user complaint or feedback on the performance of the utility supply network; a user subscribing to a repair notification; and a call by the user to a customer service call centre of the utility supply network operator providing feedback on the performance of the network.

The performance data and the historic performance data may comprise objective data relating to measurements of the performance of the utility supply network.

The objective data may comprise measurements of the performance of the utility supply network for the user submitting a communication regarding the performance of the utility supply network.

The objective data may comprise measurements of the performance of the utility supply network for other users of the utility supply network. For example, where the user and the other users are supplied by a common network resource or item of network equipment. In the case that the utility supply network is a mobile communications network, the common network resource or item of network equipment may be one or more of: a base transceiver station, a radio network controller, and a transmission link.

A fault may be determined in response to the number of communications (for example, the number of status checks) from users regarding performance of the utility supply network in a geographical region exceeding a threshold during a pre-determined time period.

Comparing the performance data and the historical performance data may comprise comparing the measurements of the performance of the utility supply with historical performance of the utility supply network.

In the case that the utility supply network is a mobile communications network, the measurements of the performance of the utility supply network may be measurements of the performance of the mobile communications network, and comparing the measurements of the performance of the utility supply network with historical performance of the utility supply network may comprise comparing the measurements of the performance of the mobile communications network with measurements of the historical performance of the mobile communications network. The measurements of the performance of the mobile communications network may comprise at least one of: signal strength received at a mobile device connected to the mobile communications network, transmitter output power, transmitted data rates, latency, voice quality, bit error rate, and SINAD.

In the case that the utility supply network is a mobile communications network, comparing the performance data with historical performance data may comprise comparing the performance data with historical performance data from a portion of the mobile communications network based on similarity with the portion of the communications network related to the performance data. Similarity may be based on at least one of: a number of current users, cell size, the geographic nature of the cell; and the demographic nature of the cell.

The network fault diagnosis tool may further comprise determining the likelihood that the determined fault is the actual fault and diagnosing the fault based on the likelihood. The likelihood may be based on a similarity between the performance data and the historical performance data. An artificial intelligence algorithm may modify the likelihood that the determined fault is the actual fault based on historical faults identified in the historical performance data. The likelihood that the determined fault is the actual fault may be reduced in response to historical performance data similar to the performance data leading to an incorrect diagnosis of the fault. The likelihood that the determined fault is the actual fault may be increased in response to historical performance data similar to the performance data leading to the correct diagnosis of the fault.

The network fault diagnosis tool may be further configured to determine a further fault has occurred in a maintenance window of a portion of the utility supply network based on communications being received from users regarding the performance of the utility supply network while performance data is still being received from the portion of the utility supply network.

According to a second aspect of the invention, there is provided a computer-implemented method of diagnosing faults in a utility supply network. The method comprises: receiving performance data indicative of performance of the utility supply network; obtaining, from a database, historical performance data indicative of historical performance of the utility supply network and a fault associated with the historical performance data; and determining a fault in the utility supply network based on comparing the performance data and the historical performance data.

The utility supply network may be a communications network, such as a mobile communications network.

The performance data and the historical performance data may comprise subjective data relating to a user perception of the performance of the utility supply network.

The subjective data may be generated in response to a communication from the user regarding the performance of the utility supply network. For example, in response to a "status check" by the user, that is, a request by a user for the current status (expected performance) of the utility supply network.

The subjective data may be generated in response to one or more of: a user requesting a status check on the performance of the utility supply network; a user complaint or feedback on the performance of the utility supply network; a user subscribing to a repair notification; and a call by the user to a customer service call centre of the utility supply network operator providing feedback on the performance of the network.

The performance data and the historic performance data may comprise objective data relating to measurements of the performance of the utility supply network. The objective data may comprise measurements of the performance of the utility supply network for the user submitting a communication regarding the performance of the utility supply network.

The objective data may comprise measurements of the performance of the utility supply network for other users of the utility supply network. The user and the other users may be supplied by a common network resource or item of network equipment. In the case that the utility supply network is a mobile communications network, the common network resource or item of network equipment may be one or more of: a base transceiver station, a radio network controller, and a transmission link.

A fault may be determined in response to the number of communications from users regarding performance of the utility supply network in a geographical region exceeding a threshold during a pre-determined time period.

Comparing the performance data and the historical performance data may comprise comparing the measurements of the performance of the utility supply with historical performance of the utility supply network.

In the case that the utility supply network is a mobile communications network, the measurements of the performance of the utility supply network may be measurements of the performance of the mobile communications network. Comparing the measurements of the performance of the utility supply network with historical performance of the utility supply network may comprise comparing the measurements of the performance of the mobile communications network with measurements of the historical performance of the mobile communications network. The measurements of the performance of the mobile communications network may comprise at least one of: signal strength received at a mobile device connected to the mobile communications network, transmitter output power, transmitted data rates, latency, voice quality, bit error rate, and SINAD.

In the case that the utility supply network is a mobile communications network, comparing the performance data with historical performance data may comprise comparing the performance data with historical performance data from a portion of the mobile communications network based on similarity with the portion of the communications network related to the performance data. Similarity may be based on at least one of: a number of current users, cell size, the geographic nature of the cell; and the demographic nature of the cell.

The method may further comprise determining the likelihood that the determined fault is the actual fault and diagnosing the fault based on the likelihood. The likelihood may be based on a similarity between the performance data and the historical performance data.

The method may further comprise modifying, using an artificial intelligence algorithm, the likelihood that the determined fault is the actual fault based on historical faults identified in the historical performance data. The likelihood that the determined fault is the actual fault may be reduced in response to historical performance data similar to the performance data leading to an incorrect diagnosis of the fault. The likelihood that the determined fault is the actual fault may be increased in response to historical performance data similar to the performance data leading to the correct diagnosis of the fault.

The method may further comprise determining a further fault has occurred in a maintenance window of a portion of the utility supply network based on communications being received from users regarding the performance of the utility supply network while performance data is still being received from the portion of the utility supply network.

According to a third aspect of the invention, there is provided instructions which, when executed by a computer, cause the computer to carry out the method according to the second aspect.

BRIEF DESCRIPTION OF THE DRAWINGS

The invention shall now be described, by way of example only, with reference to the accompanying drawings in which.

DETAILED DESCRIPTION

The invention relates to a network fault diagnosis tool for diagnosing faults in a utility supply network—in the following example, a communications network. The network fault diagnosis tool diagnoses faults in the communications network by comparing current network performance data with historic network performance data relating to known network faults.

Figure 1:
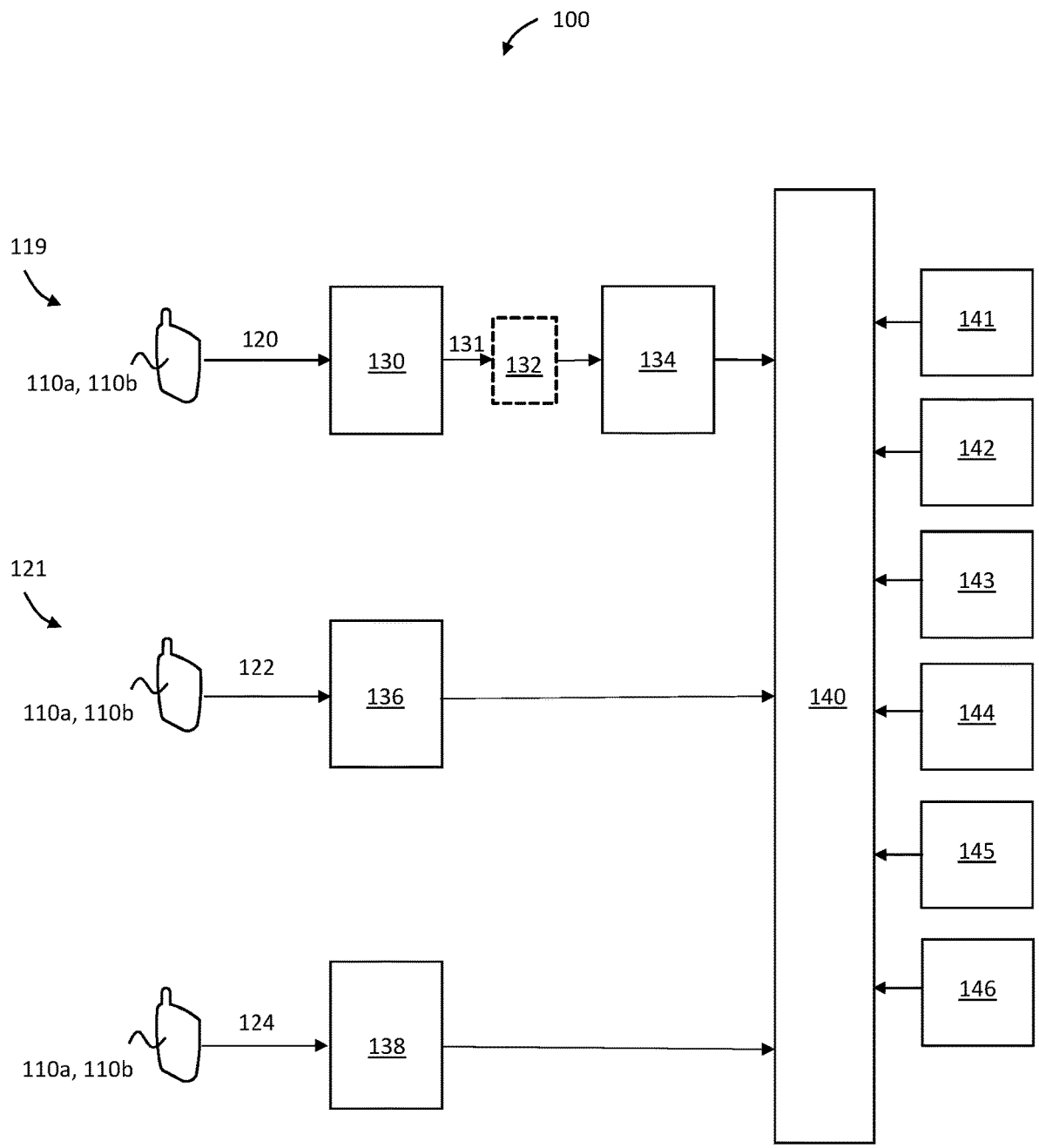
FIG. 1 illustrates a system for collecting performance data about a communications network for use in diagnosing faults in the communications network.

FIG. 1 illustrates a system 100 for collecting performance data about a communications network for use in diagnosing faults in the communications network. The performance data includes subjective data 124 and objective data 120, 122:

Subjective data 124 is performance data related to the user's perceived performance of the communications network and is derived from user-reports of issues with the communications network. The subjective data 124 may include status checks by the user and other user-reported metrics.

Objective data 120, 122 is performance data derived from measurements from mobile devices 110a belonging to the users reporting issues with the communications network as well as measurements from mobile devices 110b belonging to other users nearby (to help distinguish between faults caused by mobile devices 110a and faults caused by a fault in the communications network). Objective data 120, 122 may include both measurements taken by mobile devices 110a belonging to users reporting issues and mobile devices 110b belonging to other users nearby. The measurements taken indicate the service quality the mobile devices 110a, 110b are experiencing (for example, received signal strength, transmitter output power, received and transmitted data rates, latency, voice quality, bit error rate, signal-to-interference, noise and distortion (SINAD) and any other metric which the mobile devices 110a, 110b are capable of reporting).

The performance data (subjective data 124 and objective data 120, 122) is stored in database 140 to build up a body of historical performance data which can be used in the diagnosis of future network faults. As the causes and impact of network faults are identified, these can be stored alongside the associated historical performance data in the database 140.

The network fault diagnosis tool can then compare current network performance data against comparable historic data in order to diagnose the cause of a fault in the communications network, based on what was identified to be the cause of the fault in the comparable historic data. In effect, the network fault diagnosis tool assesses whether similar network circumstances have occurred in the past, such as a similar level and distribution of affected users (as evidenced by the subjective data 124 such as status check requests) and similar network performance conditions (based on objective data 120, 122 measured from the mobile devices 110*a* belonging to the user reporting issues as well as measurements from other nearby mobile devices 110*b*), and optionally based upon a similar type of area (such as urban, suburban, rural, indoor, outdoor, etc).

The network fault diagnosis tool is able to learn from the outcomes it proposes by comparing its proposal with the true cause of the fault entered into the database 140 after definitive diagnosis by a communications network engineer or a similarly robust method of diagnosis (for example, an artificial intelligence-based diagnosis tool or any other method of diagnosis which is deemed by the network operator to provide a definitive diagnosis).

Further details of the nature of the subjective and objective performance data will now be discussed with reference to FIG. 1.

Subjective Data 124

Subjective data 124 is user-generated data on the status or performance of the network perceived by the user of mobile devices 110*a* belonging to users reporting issues and mobile devices 110*b* belonging to other users nearby. Such subjective data 124 may be generated in a number of different ways, including:

- Status checks—these are checks made by the user, typically using an app on their mobile device 110*a*, 110*b* that has been provided for the purpose by the network operator (the app typically has many other functions as well, such as providing the ability to access the user's bill, usage to date, coverage maps etc.). The user will typically undertake a status check when they are experiencing a problem with the communications network or when they are receiving a poorer service than they might expect. A status check typically involves pressing a virtual button in the app on the touch-screen of the mobile device 110*a*, 110*b* which sends a message to the network operator asking if there is any known problem on the communications network local to the user. If there is a known problem, an explanatory message will typically be sent to the user's mobile device 110*a*, 110*b* in response, acknowledging that there is a problem and perhaps indicating the nature of the problem and when it will be rectified. A status check can also be undertaken in a similar way using a web browser pointed to the operator's website.
- Feedback reports—these can either be reports voluntarily submitted by the user (for example, via the network operator's website) which are essentially complaints about the service the user is receiving, or reports elicited by the network operator sending out a survey to selected users. Such surveys could, for example, be targeted at users in an area where it is possible that a problem exists—where other local users have undertaken status checks, for example—and the network operator wants to understand other users' experiences.
- Notification subscriptions—users can subscribe to notifications relating to when a network repair will be completed. A large number of such subscriptions (in a given area) could indicate that a large number of users are very unhappy about the service (or the lack of service) that they are currently receiving and are keen to know the moment it is restored to normal.
- Calls to a call centre—users may call a customer service call centre to ask about the status of the network in their local area and to report problems with their service. A large number of calls from a particular area could indicate that there is a problem in that area.

There are, of course, many other possible ways in which a user could communicate their subjective view of the network (for example, via social media, either involving the operator or just complaining generally). It should be emphasised that all of the above reports (from users) are subjective—they relate to the user's perception of the network—and do not necessarily indicate that a fault exists, simply that the network, for whatever reason, does not meet the expectations of that particular user, in that particular location, at that particular time. Clearly, however, a large number of such reports, in a given area, at a given time, are potentially indicative of a network problem, even if that problem is simply 'congestion'.

The subjective data 124 is collected by subjective data server 138. The subjective data 124 may be collected automatically (for example, from status checks performed on an app or website, or electronic feedback reports) or manually entered (for example, following a call with a call centre, the operator may manually enter the subjective data 124 into the subjective data server 138). The subjective data server 138 processes the subjective data 124 into a format suitable for database 140, before loading the subjective data 124 onto the database 140 where it is associated with an anonymised device identifier for the particular mobile device 110*a*, 110*b*, to allow the subjective data to later be associated with other relevant performance data for the particular mobile device 110*a*, 110*b*, such as the objective measurement data discussed below.

Objective Data 120, 122

FIG. 1 illustrates two methods for collecting objective data 120, 122: batch-data collection 119 and live-data collection 121.

Batch-Data Collection

Batch-data collection 119 periodically (typically hourly) collects measurement data 120 from all mobile devices 110 connected to the communications network at measurements collection server 130. Given the need to collect measurement data 120 from all mobile devices 110 connected to the communications network, batch-data collection 119 is designed to handle very large volumes of data. For example, although measurement data 120 is typically collected from each mobile device 110*a*, 110*b* every hour, the exact collection times from each individual mobile device 110*a*, 110*b* may be randomly staggered to ensure that not all mobile devices 110 are trying to send their measurement data 120 simultaneously.

The measurement data 120 comprises measurements taken by a mobile device 110*a*, 110*b* of the network service quality it is experiencing (for example, received signal strength, transmitter output power, received and transmitted data rates, latency, voice quality, bit error rate, signal-to-interference, noise and distortion—SINAD—and any other metric which the mobile device 110*a*, 110*b* is capable of reporting).

Measurements collection server 130 generates a measurement report data file 131 for each set of measurement data from a mobile device 110*a*, 110*b*. The measurement report data file 131 contains the measurement data 120 together with a timestamp indicating the time and date at which the measurement data 120 was collected and an identifier associated with the mobile device 110*a*, 110*b* (which is typically an anonymised version of the identifier provided by the mobile device 110*a*, 110*b*, to protect user privacy).

The measurement collection server 130 typically adds each measurement report data file 131 to a data queue 132 to await processing by the measurements batch processor 134.

The measurements batch processor 134 takes the measurement report data files 131 from the data queue 132 and essentially provides a translating/transformation process, converting the measurement report data files 131 and the data within them into the correct format to be stored in the database 140.

The data leaving the measurements batch processor 134 to enter the database 140 typically contains some or all of the following:

1) Anonymised identification—the digital identifier for the mobile device 110*a*, 110*b* from which the data originated is discarded and an anonymous (random) identity is attached. This allows the data from a particular mobile device 110*a*, 110*b* to be assessed over time without (potentially) infringing the privacy of the user of the mobile device 110*a*, 110*b*. Anyone interrogating the database 140 would be unable to identify the mobile device 110*a*, 110*b* or its user, and would only be able to identify that measurements have come from the same mobile device 110*a*, 110*b* or user.
2) A randomised identifier for the measurement report itself, to allow duplicates to be recognised and eliminated.
3) A location identifier indicating the network area, or a specific location within that area, in which the mobile device 110*a*, 110*b* was operating at the time the measurements were taken.
4) The location of the cell site which was serving the mobile device 110*a*, 110*b* at the time the measurements were taken.
5) The (compass) bearing of the mobile device 110*a*, 110*b* from that cell site.
6) The approximate distance of the mobile device 110*a*, 110*b* from the cell site's location.

The measurements batch processor 134 typically runs periodically (hence the requirement for the data queue 132), with an interval between initiating each run typically being around five minutes.

Although only a single measurement collection server 130 is shown in FIG. 1, it is possible to have multiple measurement collection servers 130, each feeding one or more batch processors 134.

Live-Data Collection

Live-data collection 121 collects live measurement data 122 from a mobile device 110*a*, 110*b* of the network service quality it is experiencing (for example, received signal strength, transmitter output power, received and transmitted data rates, latency, voice quality, bit error rate, signal-to-interference, noise and distortion—SINAD—and any other metric which the mobile device 110*a*, 110*b* is capable of reporting) at that point in time and/or the recent past (such as the network service quality the mobile device 110*a*, 110*b* experienced since a last scheduled upload of measurement data 122).

Live data collection 121 is triggered in response to the generation of subjective data 124. For example, a user performing a status check from their mobile device 110*a* causes live measurement data 122 to be obtained from the mobile device 110*a* which requested the status check.

Live measurement data 122 may also be requested from other mobile devices 110*b* which have not initiated a status check, but which happen to be local to an area of interest, either based for example upon the number of status checks in that area or a specific operator interest (such as at a stadium during an event). In both cases, the trigger for the collection of live measurement data 122 is subjective, i.e. a network user is, in their opinion, experiencing a poor or degraded level of service relative to that which they have experienced in the past or would reasonably expect to receive. This is inherently subjective, as different users will have differing opinions (or thresholds) as to what constitutes 'poor' or 'degraded'. Collecting live measurement data 122 from other mobile devices 110*b* may aid in determining whether the issue which caused a user to initiate a status check is unique to that user (meaning that it may well be a problem with his/her mobile device 110*a*) or more general to the area (and if so, ascertain how widespread the issue might be). A more general experience of the problem (e.g. a low data rate) may well indicate that there is an issue with the communications network in that area.

Other triggers may also initiate live data collection 121, such as submitting web-based status requests or complaints. In this case, full live measurement data 122 may be collected from nearby mobile devices 110*b* while simpler data (such as network speed) may be collected from the web-based user or users. It is also possible to infer the identity of the connection type of the web-based user (i.e. Wi-Fi or cellular). In the case of a cellular connection, the network speed will indicate the user's network experience. If the user is connected over Wi-Fi, this may indicate that there is a catastrophic issue with the cellular network in that area (since the user needs to resort to Wi-Fi to request a status check). Measurement data from web-based users can be filtered out (and not used in subsequent fault analysis, for example) if the user is identified as not using the network operator's network when making the status check or not using it in the location about which the status check or coverage query is made.

Live data collection 121 typically comprises fewer servers (perhaps one-tenth of the number involved in batch-data collection 119), since far less live measurement data 122 is collected (or needs to be collected) than batch measurement data 120—live measurement data 122 only needs to be collected in response to a user-initiated status check, and only then within a given area or region, and there are few of these checks relative to the number of mobile devices 110 active on the communications network at a given point in time. Essentially, live measurement data 122 is only uploaded when it is interesting to do so, that is, there is an immediate reason to do so, and this uploading is undertaken immediately.

The live data server 136 enters the live measurement data 122 into the database 140 along with one or more of the following:

1) Anonymised identification—the digital identifier for the mobile device 110*a*, 110*b* from which the live measurement data 122 originated is discarded and an anonymous (random) identity is attached. This allows the live measurement data 122 from a particular mobile device 110*a*, 110*b* to be assessed over time without (potentially) infringing the privacy of the user of the mobile device 110*a*, 110*b*. Anyone interrogating the database 140 would be unable to identify the mobile device 110*a*, 110*b* or its user, and would only be able to identify that measurements have come from the same mobile device 110*a*, 110*b* or user.

2) A randomised identifier for the live measurement data 122, to allow duplicates to be recognised and eliminated.

3) A location identifier indicating the network area, or a specific location within that area, in which the mobile device 110*a*, 110*b* was operating at the time the measurements were taken.

4) The location of the cell site which was serving the mobile device 110*a*, 110*b* at the time the measurements were taken.

5) The (compass) bearing of the mobile device 110*a*, 110*b* from that cell site.

6) The approximate distance of the mobile device 110*a*, 110*b* from the cell site's location.

Database 140

The database 140 stores all of the measurement data (batch or live) in the form of records or tuples, within tables, in its structure. The database is typically an off-the-shelf product (such as Oracle, Postgres and the like) which is configured for this specific application (i.e. that of storing, and allowing access to, data collected from individual mobile devices 110). It can be accessed by the network operator directly or by other systems owned, managed or used by the network operator.

The database may also store data from a range of other pertinent data sources to aid in fault diagnosis, such as:

1) Data 141 relating to network change requests (requests for changes to the network configuration, such as the position or pointing angle of one or more antennas, the installation or de-commissioning of a base-station, etc.) and/or planned maintenance operations. This can help to inform decisions regarding whether a network change may be the root cause of an increase in the number of status checks locally to the change or if they may simply be as a result of a planned local outage in the network for maintenance or upgrade purposes.

2) Data 142 relating to 'trouble tickets' and/or known incidents on the network. These are incidents or problems of which the network operator is already aware and which may or may not be being dealt with already. Such information can be communicated to the users (e.g. in response to a status check), as appropriate.

3) Data 143 relating to network configuration information, such as cell-site locations, RNC/BSC parents and connectivity, antenna pointing angles, transmit power levels, etc. This information can be used, for example, to determine from which nearby mobile devices 110*b* measurement data should be requested, in the event of one or more local users initiating a status check.

4) Data 144 relating to network alarms. This can be used to correlate status checks and (poor) measurement data with known alarm conditions and, potentially, thereby raise their status within the maintenance hierarchy.

5) Data 145 relating to network performance characteristics, such as the amount of traffic being handled by each cell and the availability of each cell.

6) Data 146 from a network planning tool, including the designed network topology (which may not necessarily exactly match the network as deployed). This database will contain coverage maps and coverage predictions and may be used to assess whether the reported issue stems simply from the fact that the user is outside of the designed network coverage area.

Data 143, 145 and 146 provide the basis for a root-cause analysis to be undertaken, in order to identify the location (within the network hierarchy) of the faulty element.

Combining Subjective Data 124 and Objective Data 120, 122

Since data in the database 140 is associated with an (anonymised) identifier for each mobile device 110*a*, 110*b*, subjective data 124 based on status checks and other information provided by the user of the mobile device 110*a*, 110*b* can be associated with objective data 120, 122 (batch and/or live measurement data) from the same mobile device 110*a*, 110*b*.

For example, if a user requests a status check from the network operator's app running on mobile device 110*a*, data relating to the status check will be stored on the database 140 with an anonymised identifier associated with mobile device 110*a*. Simultaneously, or soon after, live measurement data 122 will be requested from mobile device 110*a*, either by the live data server 136 or the app itself, and this live measurement data 122 will also be assigned to the anonymised identifier associated with mobile device 110*a*.

In this way, the subjective data 124 and objective data 120, 122 may be combined when the database is queried to form a richer and more powerful resource to assist the network operator in identifying and diagnosing faults.

Each of the blocks of FIG. 1 could be implemented by a physically separate piece of hardware (such as a computer, server, hard disk storage unit or other item of electronic hardware), or some functions could be combined into a single piece of hardware (e.g. the measurement collection server 130, data queue 132 and measurements batch processor 134). It is also possible that some or all of these hardware items could be virtualized and be assigned to disparate hardware elements by a third-party service provider, such as a cloud computing services provider. In this case, a 'server' could actually be a virtual server, with tasks executed and spread across a number of physical hardware devices, potentially in different physical locations. In all of these physical hardware configurations, however, the main elements shown will be present, either physically/individually, or in varying degrees of virtualisation.

The system of FIG. 1 has the ability to scale as needed, that is, it is straightforward to add more computing resources as required, depending upon the volume of reports it is receiving. This may well increase over time as more customers are encouraged to sign-up to use the operator's service-reporting/billing app. The system could be implemented on a cloud computing platform to facilitate scaling.

Fault Diagnosis Using Current and Historical Performance Data

The performance data (subjective data 124 and objective data 120, 122), collected by the system of FIG. 1 and stored in the database 140 over time, can be used in diagnosing faults in the communications network.

Figure 2:
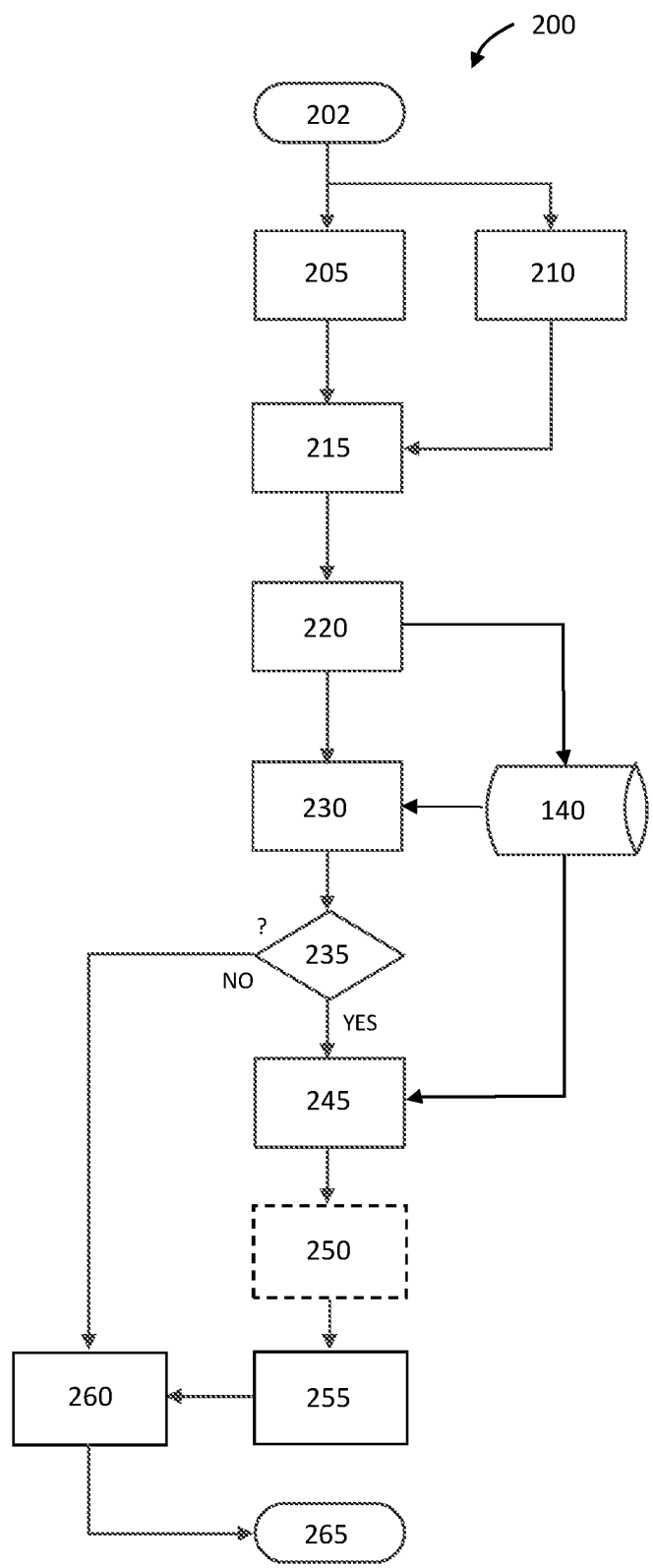
FIG. 2 is a flowchart illustrating a method for diagnosing faults in the communications network by comparing current and historic performance data about the communications network.

FIG. 2 illustrates a method 200 to be performed by a fault diagnosis tool which compares current network performance data with historical network performance data stored in database 140 to diagnose a fault in the communication network.

The method 200 begins at step 202 and then moves to steps 205 and 210 in parallel in which performance data is received from users via their mobile devices 110 or directly from their mobile devices 110.

In step 205, subjective data 124 (such as status check requests) is received from the mobile device(s) 110. A count may be undertaken of the number of reports of subjective data 124 (such as the number of status check requests)

received within a given area, over a given (rolling) time period. The count may be used for prioritising which potential faults are investigated, for example, prioritising areas with a higher proportion of status check requests relative to the number of users in the area in the given time period.

In step 210, objective data 122 is received from the mobile device(s) 110a reporting a problem and, optionally, objective data 122 is obtained from other mobile devices 110b active locally to the mobile device(s) 110a or connected via the same resources (e.g. BTS, RNC, transmission link etc.). This objective data 122 takes the form of live measurement data 122 on various RF and geographic parameters, such as location, signal strength or RSSI, bit-error rate, latency, dropped-call or call-retry statistics or any other quality-of-service related metrics measured and recorded by the mobile device 110a, 110b.

At step 215, the subjective data 124 and objective data 120, 122 are combined on a per-mobile device basis and stored in the database 140 at step 220. The database 140 contains records of historical faults, along with the objective and subjective measurements associated with those historical faults. At step 230, an approximate match is sought between the current objective and subjective data 124 recorded in the database 140 at step 220 and historical objective and subjective measurements previously recorded in the database 140, to identify possible faults based on the faults identified for the historical objective and subjective measurements.

In step 230, user status-check reports may be clustered based on their spatial relationship with one another (for example, using the 'cluster-forming' algorithm described in UK patent publication number 2,546,118). For a given cluster of user status-check reports, in a given area (indicating a possible network fault), any or all of the following factors may be analysed: the current number, rate of increase and geographic distribution of reports, together with any or all of the measurement data metrics (e.g. RSSI, bit-error rate etc.) captured from the user devices. These factors and metrics are compared to similar factors and metrics recorded for past incidents on the network, from database 240. The comparison process may be pre-filtered to only include areas/cells of a similar type in the comparison, whether characterised by the number of current users, the size of the cell, the geographic and/or demographic nature of the cell (city-centre, urban, rural, forested, hilly, coastal etc.) or any other suitable pre-filtering metric. This may both speed up the process and reduce the number of 'false-positives' in which a match is found and a root-cause analysis (discussed below) subsequently undertaken, only to find that the type, size, location etc. of the cell (for example) in the comparable report is such that the diagnosis is not borne out by reality. For example, a similar distribution or rate of increase of problem reports together with similar data contained in measurement reports, for a large rural cell, may be due to entirely different reasons than in a small urban cell.

The method then moves on to step 235 in which a decision is made as to whether a sufficiently close match exists between the current situation (both in terms of the subjective data 124 and the objective data 120, 122) and one or more historic situations (optionally, in a comparable context, such as the same location, or a location with similar geography, or the same cell or a cell with similar size, etc.).

If a match is not found, the method moves on to step 260, in which the details of the current incident, its geographic and network characteristics (e.g. cell-size), objective and subjective measurement data and the timing of the receipt of the subjective data 124, together with details of the ultimate fault found (or none) are recorded in database 140 to aid future fault diagnosis and the method ends at step 265.

If, on the other hand, a match is found in step 235, the method moves on to step 245 in which the root-cause of the historic fault is retrieved from database 240. It may be that a number of historic events are relevant, i.e. there are a number of positive outcomes from the test undertaken in step 235, in which case each is retrieved from database 240.

The method then optionally moves on to step 250 in which a probability or likelihood of the diagnosis being correct is assigned to each identified match. This may be based, initially, upon the closeness of the fit of the objective data 120, 122 and subjective data 124 between each matched (historic) event's data and that of the current situation.

Ultimately, this may be modified by a degree of self-learning in which the outcomes of previous attempts at diagnosis will be used to either temper or reinforce the probabilities assigned in this step. This aspect is discussed in more detail below in relation to FIG. 3.

The method then moves to step 255 in which the identified potential fault or faults, together with its or their associated probability scores are reported to a network maintenance console (or similar) for actioning by the operator's network maintenance team.

The method then moves to step 260, in which the data and outcome are stored, as discussed above, and the method ends at step 265.

It is possible that only a single match and hence possible fault will be identified, in which case a probability that this is a correct identification is still likely to be assigned; in this case it could more properly be viewed as a 'confidence score'. If, for example, the only identified match has a relatively poor correlation with the current situation (for any reason, either a poor match of objective, subjective, geographic or situational data), then a low probability or confidence score may be attached to this fault diagnosis. In this event, the network operator may choose to ignore the diagnosis or may make further enquiries of his network, prior to committing a team to repair the identified potential fault. If, on the other hand, the probability is high (and the operator has gained confidence in the system, based upon past experience), then he may choose simply to act upon the diagnosis returned by the system.

It is worth noting that planned maintenance or upgrade works can also be the source of significant numbers of status checks from users. Such planned works normally take place within a time window, although they rarely take up the whole of this time window, or even the majority of it. For example, a maintenance visit to a given site may be scheduled between 8 am and 6 pm on a particular day, but the actual amount of work involved may only mean that the site is impacted (e.g. off-air) for an hour. It would be easy to (erroneously) ascribe all status checks in the maintenance window to that root cause (i.e. the fact that maintenance is taking place). This approach would mask the appearance of a real (or additional) fault during the maintenance window and would mean that the operator would miss the opportunity of having that fault repaired at the same time as the scheduled maintenance. Since maintenance visits are expensive, with access permissions needing to be sought or significant travel to remote locations, it would be advantageous to identify and diagnose faults during maintenance windows, in the same manner as other faults.

A simple way of doing this is to check that objective data 120, 122 is still being received from the site at the same time as status checks are being received from users—this indicates that the site is still active (as reports are being received), but perhaps performing poorly (as evidenced by the number of user status checks). In this case, it is likely that a fault (or additional fault) has developed and this can be flagged up to the operator. If no objective data 120, 122 is being received, it is reasonable to conclude that the site has been taken off air for maintenance and the site's users can be informed appropriately (via other, local, sites). Whilst this method is not totally fool-proof (the site may have suffered a catastrophic failure either prior to or following the maintenance visit, resulting in no measurement reports being received), it is much better than simply assuming that maintenance is the cause of all status checks within the time window.

Fault Diagnosis Using Self Learning

Figure 3:
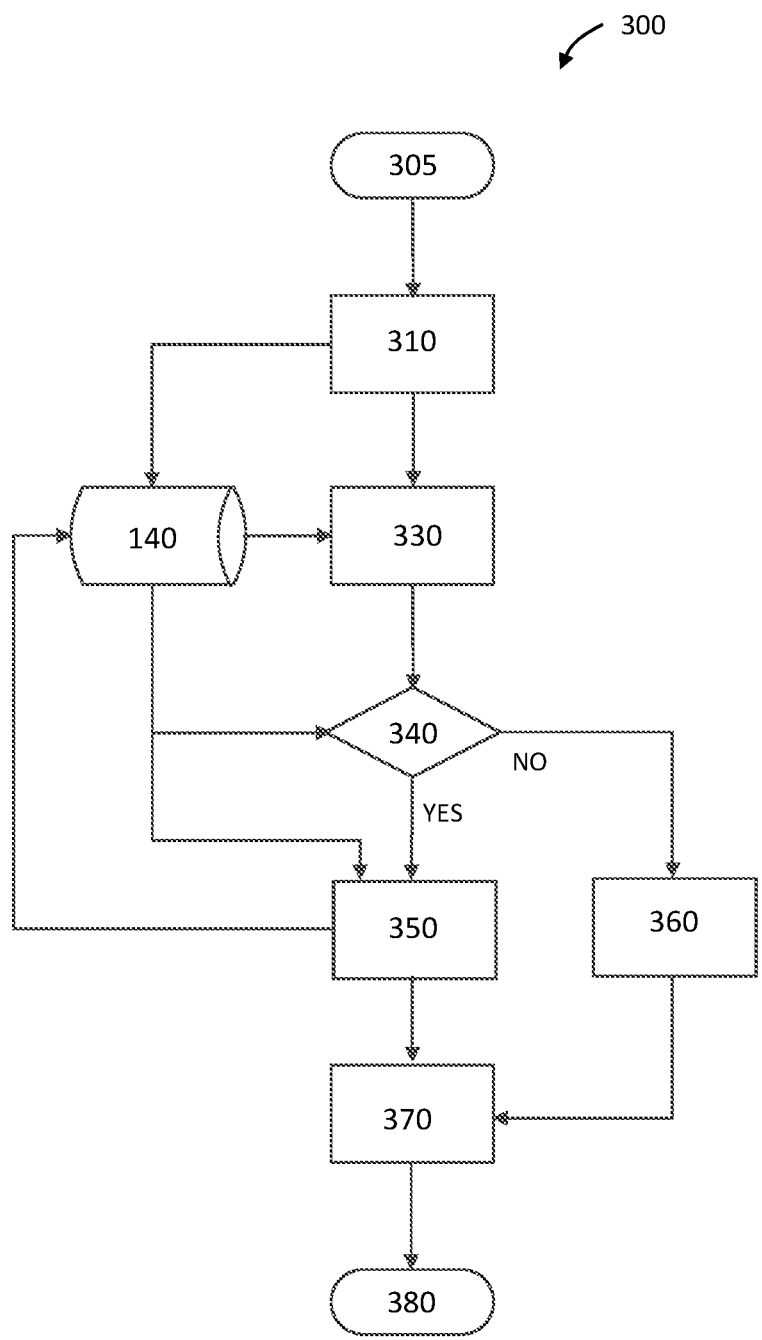
FIG. 3 is a flowchart illustrating an example of a self-learning process for diagnosing faults in the communications network.

As discussed briefly above, the method 200 for diagnosing faults in a communications network may be augmented by adding an ability to 'self-learn'. FIG. 3 illustrates a method 300 where the operator is able to feedback on the nature and location of the actual fault, should it differ from that diagnosed by the method 200, or provide an indication of which of the diagnosis options provided by the method 200 was, in actuality, the correct one. This feedback can then be used to 'bias' the calculated probabilities and hence, ultimately, the diagnoses which the method generates (or their relative probabilities).

The method 300 begins at step 305 and continues to step 310 in which the network operator will identify the actual nature of historic faults that have occurred in the communications network. It is intended that the network operator will do this for any and all faults occurring on the communication network, with the identity of historic faults being associated with any available network performance data (objective data 120, 122 and subjective data 124) collected at or around the time of the fault and covering an area impacted by the fault (for example, the same or adjacent cells).

At step 330, a new fault is diagnosed (for example, using the method 200 described in relation to FIG. 2). This new fault diagnosis has a probability or confidence score associated with it, as discussed in relation to step 250 of FIG. 2.

Next, at step 340, it is established whether or not the fault newly-diagnosed in step 330 is the same as, or similar to, a previous wrongly-diagnosed fault (for example, having the same or similar performance data as a previous wrongly-diagnosed fault, and perhaps the same or similar circumstances, such as, similar geography, topography, cell-size, etc.).

If the newly-diagnosed fault is the same, or similar to, a previous wrongly-diagnosed fault, the method proceeds to step 350 in which the associated probability or confidence score calculated in step 330, is reduced by a percentage, X %, where X may be 10, for example (or any other figure which is >0 and <100). This new probability is stored in database 140 and associated with the gathered measurement reports and associated circumstances, as previously. Thus, next time that a similar fault diagnosis is highlighted, in a given set of circumstances, the new, lower, probability may be reported (or further modified, as just discussed, in the light of a perhaps yet further misdiagnosis). Likewise, the actual fault, entered by the network operator in step 310, may now appear as a possible diagnosis, initially with a low probability.

If, after identifying the actual nature of the fault in step 310, it transpires that the same actual fault has occurred previously, in similar circumstances (for example, having the same or similar performance data and perhaps the same or similar circumstances, such as similar geography, topography, cell-size etc.), then its associated probability figure may be increased by Y % (where Y may equal X, or may be any other number >0 and <100). In this way, the method 300 can gradually promote what may initially be unlikely diagnoses, in the light of repeated experience and demote what may initially appear to be likely diagnoses.

If, in step 340, no similar or previously wrongly-diagnosed faults are found in database 140, then a probability or confidence score is assigned in step 360 using the method at step 250 discussed in relation to FIG. 2.

Finally, in step 370, the diagnosed fault and its associated probability is reported to the network operator to a network maintenance console (or similar) for actioning by the network operator's network maintenance team. The method then ends at step 380.

The goal of the method 300 is to improve the reliability of fault diagnosis, that is, to improve the percentage of times that the correct fault is diagnosed. Any algorithm capable of achieving this aim, whilst incorporating objective, subjective and historical data, may be used. For example, any suitable self-learning or similar artificial intelligence mechanism may be employed instead or as well.

It is worth noting that it is not essential for each communications network to 'learn' from scratch, nor for it to start with an empty 'historical incidents' database 140. A database may be copied from a similar network with similar geographic features, for example, for a desert-dominated nation, a database could be used from a similarly desert-dominated nation. Likewise, the 'learning' from the earlier deployment (e.g. 4G) could be built-in to the later (e.g. 5G) deployment's implementation of the method, to give it a strong basis from which to learn further.

Application to Other Utility Supply Networks

It is possible to apply the invention described above to diagnose faults in all kinds of communications networks, including 2G, 3G, 4G, 5G, PMR/SMR, Wi-Fi, etc.

Equally, it is possible to apply the invention to a fixed-line data network, such as a 'broadband' internet network (e.g. using DSL, fibre optics or similar). In such a case, the invention could be used to diagnose faults in roadside cabinets containing switching or routing equipment or any other equipment which serves a number of users in a given locality. For example, a user connected to the same roadside cabinet who was experiencing poor service could perform a service check (e.g. using a device connected to a cellular data service) and data about the service could be measured (such as upload and download speeds) from the user and other users connected to the same roadside cabinet. The measurements could be compared to historical measurements from the same, or similar, cabinets where the historical fault has been identified in order to diagnose the present fault, Although the invention has been described in the context of the utility supply network being a communications network, the skilled person will appreciate that the invention is applicable to other utility supply networks, such as electricity, water and gas, in which case different measurement data would be required which is relevant to those utilities.

The invention claimed is:

1. A computer-implemented method of diagnosing faults in a utility supply network, the method comprising:
   receiving, from a user device, performance data indicative of performance of the utility supply network, the performance data comprising:
   subjective data relating to perception of the performance of the utility supply network by a user of the user device; and objective data relating to measurements of the performance of the utility supply network;
storing, in a database, the performance data associated with the user device;
obtaining, from a database, historical performance data indicative of historical performance of the utility supply network and a fault associated with the historical performance data; and
determining whether there is a fault in the utility supply network based on comparing the performance data and the historical performance data.

2. The method of claim 1, wherein the historical performance data comprises subjective data relating to a user perception of the performance of the utility supply network, wherein the subjective data is generated in response to a communication from the user regarding the performance of the utility supply network.

3. The method of claim 2, wherein the subjective data is generated in response to one or more of: a user requesting a status check on the performance of the utility supply network; a user complaint or feedback on the performance of the utility supply network; a user subscribing to a repair notification; and a call by the user to a customer service call centre of the utility supply network operator providing feedback on the performance of the network.

4. The method of claim 3, wherein the historic performance data comprise objective data relating to measurements of the performance of the utility supply network.

5. The method of claim 4, wherein the objective data comprises measurements of the performance of the utility supply network for the user submitting a communication regarding the performance of the utility supply network.

6. The method of claim 5, wherein the objective data comprises measurements of the performance of the utility supply network for other users of the utility supply network, where the user and the other users are supplied by a common network resource or item of network equipment.

7. The method of claim 6, wherein the utility supply network is a mobile communications network and the common network resource or item of network equipment is one or more of: a base transceiver station, a radio network controller, and a transmission link.

8. The method of claim 1, wherein a fault is determined in response to the number of communications from users regarding performance of the utility supply network in a geographical region exceeding a threshold during a predetermined time period.

9. The method of claim 1, wherein comparing the performance data and the historical performance data comprises comparing the measurements of the performance of the utility supply with historical performance of the utility supply network.

10. The method of claim 9, wherein the utility supply network is a mobile communications network, the measurements of the performance of the utility supply network are measurements of the performance of the mobile communications network, and comparing the measurements of the performance of the utility supply network with historical performance of the utility supply network comprises comparing the measurements of the performance of the mobile communications network with measurements of the historical performance of the mobile communications network.

11. The method of claim 10, wherein the measurements of the performance of the mobile communications network comprise at least one of: signal strength received at a mobile device connected to the mobile communications network, transmitter output power, transmitted data rates, latency, voice quality, bit error rate, and SINAD.

12. The method of claim 1, wherein the utility supply network is a mobile communications network, and comparing the performance data with historical performance data comprises comparing the performance data with historical performance data from a portion of the mobile communications network based on similarity with the portion of the communications network related to the performance data.

13. The method of claim 12, wherein similarity is based on at least one of: a number of current users, cell size, the geographic nature of the cell; and the demographic nature of the cell.

14. The method of claim 1, further comprising determining the likelihood that the determined fault is the actual fault and diagnosing the fault based on the likelihood, wherein the likelihood is based on a similarity between the performance data and the historical performance data.

15. The method of claim 14, further comprising modifying, using an artificial intelligence algorithm, the likelihood that the determined fault is the actual fault based on historical faults identified in the historical performance data.

16. The method of claim 14, further comprising one or more of:
reducing the likelihood that the determined fault is the actual fault in response to historical performance data similar to the performance data leading to an incorrect diagnosis of the fault; and
increasing the likelihood that the determined fault is the actual fault in response to historical performance data similar to the performance data leading to the correct diagnosis of the fault.

17. The method of claim 1, further comprising determining a further fault has occurred in a maintenance window of a portion of the utility supply network based on communications being received from users regarding the performance of the utility supply network while performance data is still being received from the portion of the utility supply network.

18. The method of claim 1, wherein the utility supply network is a communications network, such as a mobile communications network.

19. A network fault diagnosis tool for diagnosing faults in a utility supply network, the network fault diagnosis tool comprising:
an input configured to receive, from a user device, performance data indicative of performance of the utility supply network, the performance data comprising:
subjective data relating to perception of the performance of the utility supply network by a user of the user device; and
objective data relating to measurements of the performance of the utility supply network; and
a processor configured to:
associate the performance data with the user device, and store the performance data associated with the user device in a database;
obtain historical performance data indicative of historical performance of the utility supply network and a fault associated with the historical performance data; and
determine whether there is a fault in the utility supply network based on comparing the performance data and the historical performance data.

20. Instructions which, when executed by a computer, cause the computer to carry out the method according to claim 1.

\* \* \* \* \*